Patented Aug. 13, 1946

2,405,658

UNITED STATES PATENT OFFICE 2,405,658

MOLDING MATERIALS

Henry Kremer, London, England

No Drawing. Application April 8, 1943, Serial No. 482,320. In Great Britain May 29, 1942

2 Claims. (Cl. 117—72)

This invention consists in improvements in or relating to molding materials and is an improvement in or a modification of the invention claimed and described in the specification of prior application for United States Letters Patent Serial No. 397,331.

The invention claimed in the prior specification comprised a dry composite molding material having an inactive filler the whole or substantially the whole of the particles of which received a double coating and/or impregnation with two different materials each of which, when dry, will constitute with the filler a moldable product. Such a dry composite material will be referred to in the following description and appended claims as "a moldable material of the kind described."

The improvement or modification according to the present invention comprises a moldable material of the kind described in which one of the coating and/or impregnating materials is a synthetic resin and the other material is either a different kind of synthetic resin or a solution containing a protein material such as blood.

When both coatings are synthetic resin materials they will be of two different types both having different qualities and advantages.

In one example of the invention the first applied coating or impregnation contains blood as the protein material and the other coating may be a synthetic resin of any type such as phenol aldehyde, cresol aldehyde, urea aldehyde, or resins of a synthetic rubber class.

In one specific example of the invention 400 ozs. of liquid blood is mixed with 13¾ ozs. of ammonium hydroxide (S. P. 0.92) after which 30 ozs. of paraformaldehyde, in the form of a milk, is then thoroughly mixed in. To this blood mixture is now added 48 lbs. of sawdust or other inert fillers and the mixture dried, after which 10 lbs. of water-soluble phenol formaldehyde resin, stage A, is mixed in so that every grain of the mixture is thoroughly coated with the resin. The latter is now dried and the resultant material is then ready for pressing or molding in accordance with the usual technique. Should the sawdust be fine a small quantity of water, say 100 ozs. may be added to the blood prior to mixing.

In another example of this type of material urea formaldehyde resin (resin content 80 to 90%) with the appropriate hardener may be used instead of phenolic resin. In this case the mixture should be molded without further drying.

As an example of the type of material in which both the coating and/or impregnating materials are synthetic resins, 15 lbs. of phenol formaldehyde resin stage A is thoroughly mixed into 50 lbs. of sawdust or other inert filler so that substantially every grain is impregnated and/or coated. This is then dried and is again impregnated and/or coated with 15 lbs. of resorcinol formaldehyde resin and is then dried and molded in the usual way. Both resins preferably have approximately 50% solid resin content.

When blood is described herein as being employed, it may be derived from any source or in place of liquid blood, blood clots only or red cells of blood or any dried product of such materials may be utilised. In the case of dried products of blood such a material is preferably formed into a dispersion or solution before use.

I claim:

1. A process for making a composite material moldable under heat and pressure which process comprises treating a particulate fibrous organic filler consisting of wood particles with sufficient blood to provide substantially all of said individual particles with a coating thereof, drying the blood-coated particles, superposing on the coated particles a coating of a water-soluble phenolic-formaldehyde resin and drying the coated particles.

2. A process for making a composite material moldable under heat and pressure which process comprises applying consecutively to substantially all the individual particles of a particulate fibrous organic filler two adherent and enveloping coatings one of which consists of a liquid comprising blood and the other of a liquid comprising an uncured phenol-formaldehyde resin, each coating operation being followed by a drying operation insufficient to cure the coatings.

HENRY KREMER.